Patented Dec. 15, 1936

2,064,797

UNITED STATES PATENT OFFICE 2,064,797

PRODUCTION OF ORGANIC AMINO COMPOUNDS

Hermann Holsten, Ludwigshafen-on-the-Rhine, Germany, assignor to I. G. Farbenindustrie Aktiengesellschaft, Frankfort - on - the - Main, Germany No Drawing. Application July 7, 1931, Serial No. 549,307. Renewed July 24, 1934. In Germany July 21, 1930

25 Claims. (Cl. 260—127)

The present invention relates to the production of organic amino compounds.

The introduction of alkyl, cycloalkyl, or aralkyl groups into ammonia or into organic compounds containing amino groups has hitherto been advantageously effected by the action of halogen alkyls or dialkyl sulphates on the nitrogenous bases. The introduction of the alkyl radicles becomes increasingly difficult with increasing size of the alkyl radicles. For example an alkylation with ethyl iodide or diethyl sulphate is less easy than with the corresponding methyl compounds. Only in very few cases have salts of acid esters of oxygen-containing mineral acids been used as alkylating agents for nitrogenous compounds. Methyl and ethyl sulphuric acid salts have been employed, the ethyl compound reacting more slowly than the corresponding methyl compound.

I have now found that valuable organic amino compounds are obtained by causing acid or neutral esters of oxygen-bearing, preferably polybasic, mineral acids with aliphatic, i. e. aliphatic open chain or cycloaliphatic, alcohols which contain more than 5 carbon atoms in their molecule, or salts of the said acid mineral acid esters, to react with ammonia bases, i. e. with ammonia or organic compounds containing amino groups. This may be effected for example by heating the components, if desired in the presence of suitable diluents, as for example water, ethyl alcohol, benzene, di-butyl ether, xylene, nitrobenzene and like inert diluents, if desired with the employment of catalysts, capable of promoting alkylation such as metallic copper or copper alloys or salts as for example copper tin alloys, cuprous chloride or cupric sulphate, and preferably in a closed vessel especially if easily volatile amines be employed, whereby the pressure in the vessel is increased. The resulting amines may be separated in the usual manner from any by-products formed at the same time. One or more alkyl groups may be introduced into the bases by the suitable choice of the amounts of the components to be brought into reaction. The reaction is generally carried out at temperatures between 80° and 300° C. and usually between 100° and 250° C.

Suitable mineral acid esters are for example the sulphuric esters of aliphatic primary, secondary or tertiary alcohols containing more than 5 carbon atoms, such as hexyl alcohol, ethylpropyl carbinol, dimethyl isobutyl carbinol, decanol, dodecanol, pentadecanol, cetyl alcohol, heptadecanol octodecyl alcohol, 9,10-octodecene-1-01 (by reduction of oleic ethyl ester with the aid of sodium), polyhydric alcohols, such as octodecandiol or sorbitol, the alcohol mixtures separated from products of a destructive oxidation of paraffin wax, or alcohols obtainable by the reduction of carboxylic acids, carboxylic acid esters or materials containing the same such as animal or vegetable fats or oils as for example tallow, olive oil, soya bean oil, coconut or castor oils, train oils and the like, and also sulphuric acid esters of cycloaliphatic alcohols, such as hexahydrobenzyl alcohol, cyclohexanol and its homologues, borneol, decahydronaphthol and the sulphuric esters of other compounds containing hydroxy groups, as for example hydroxystearic acid, ricinoleic acid, tetradecyl dihydroxypropyl ether and the like. Sulphuric acid esters which have been prepared from unsaturated compounds, as for example from hexylene, octodecylene, oleic acid or its esters or amides may also be employed. Instead of the sulphuric esters, the esters for example of sulphurous acid, phosphoric acid, boric acid or the like may be employed; but nitric and chloric esters should not be employed, for when using the latter, the reaction mixtures are liable to explode. Esters of substituted mineral acids containing oxygen, as for example benzene sulphonic acid esters, aminosulphonic acid esters and the like, may also be employed.

Generally speaking ammonia and all basic acting organic nitrogen compounds are suitable for the alkylation, as for example methylamine, ethylamine, butylamine, hexylamine, diethylamine, trimethyl amine, tri-butyl amine, ethylene diamine, or cycloaliphatic amines, such as cyclohexylamine and the like, aromatic amines, as for example aniline, mono-methylaniline, dimethyl aniline, di-ethyl aniline, naphthylamine, benzylamine, aminoanthraquinones and the like, and heterocyclic compounds are suitable in the same way, as for example piperidine, pyridine, quinoline and pyrrole. Amines which contain hydroxyl, halogen, nitro-ester, ether and like groups connected with a carbon atom may also be employed, such as mono-, di- or tri-alkylol amines, as for example mono-ethanol or propanol amines, diethanol amine, tri-ethanol amine or mixtures of these alkylol-amines. If tertiary amines be employed which do not contain a hydrogen atom connected to a nitrogen atom, quaternary bases are apparently formed intermediately, these bases being then converted into amines, so that a re-alkylation of the original amine takes place, the reaction proceeding in the same way if quaternary bases be chosen as the initial material. In most cases the yields are very satisfactory, but on working with sulphuric esters and heterocyclic bases of the type of pyridine the yields are lower than on working with non-tertiary cyclic bases.

According to the present invention it is also possible to prepare the hitherto difficultly obtainable amines of the fatty series having long carbon chains, i. e., containing from 8 to 18 carbon atoms, both readily and in a simple industrial manner and in good yields, which amines, such as pentadecylamine, could hitherto only be obtained by the costly and very difficult method via the urethane by reason of the failure of the Hofmann degradation of the acid amides in the case of the higher members of this series.

The resulting amines may be employed for a great variety of purposes, as for example as intermediate products for the manufacture of dyestuffs, pharmaceutical preparations, and wetting, cleansing and emulsifying agents and the like.

The following examples will further illustrate the nature of this invention, but the invention is not restricted to these examples. The parts are by weight.

Example 1

500 parts of crude dodecyl alcohol are esterified with 320 parts of chlorsulphonic acid. The sulphuric ester formed is slowly introduced while cooling into 3000 parts of 20 per cent aqueous ammonia and the mixture is charged into a stirring autoclave, and a further quantity of about 500 parts of liquid ammonia are added. After heating for about 10 hours at from 150° to 160° C., the oily layer formed is drawn off, washed with water and the resulting mono-dodecyl amine purified by distillation if necessary.

Example 2

35 parts of the ammonium salt of sulphuric acid mono-octodecyl ester are heated for 5 hours at 150° C. in an autoclave with 130 parts of a 33 per cent aqueous solution of methylamine. The crystal cake formed is comminuted and the amine is subjected to extraction with ethyl ether. The crude product obtained after distilling off the ether solidifies and has a melting point of from about 40° to 45° C. The hydrochloride of monomethyl octodecyl amine crystallizes from alcohol in the form of leaflets having a mother-of-pearl lustre.

Example 3

50 parts of the sodium salt of sulphuric acid mono-octodecyl ester are heated for 5 hours at about 150° C. in an autoclave with 60 parts of water and 40 parts of 92 per cent monoethanol amine. The mono-ethanol octodecyl amine may be extracted from the crystal cake which separates, as for example by means of benzene, and may be further purified by conversion into the hydrochloride or by fractional distillation.

Example 4

200 parts of a mixture of alcohols obtained by the catalytic reduction of coco fat are slowly mixed with 77 parts of phosphorus oxychloride at from 5° to 10° C., whereupon the reaction mixture is heated at 25 millimeters mercury gauge to from 35° to 40° C. in order to remove hydrochloric acid formed.

The crude mixture of phosphoric esters is heated together with 1000 parts of cyclohexyl amine in an autoclave to 250° C. for 8 hours. After cooling, unaltered cyclohexyl amine is distilled off, after rendering the reaction mixture alkaline with the aid of aqueous caustic soda solution, and the mixture of amines formed is extracted from the oily residue by means of dilute aqueous acetic acid. The solution of the acetate possesses a good foaming and wetting power.

Example 5

20 parts of the mixture of alcohols employed in the process according to the foregoing example are converted into their sulphuric ester by means of 12 parts of chlorsulphonic acid. After drying, the sodium salt of the sulphuric ester is heated for 20 hours together with 250 parts of dimethyl aniline while gently boiling. After rendering the reaction mixture alkaline with the aid of aqueous caustic soda solution, unaltered dimethyl aniline is distilled off and the reaction product is extracted from the highly viscous residue with the aid of dilute aqueous hydrochloric acid, the amine obtained from its hydrochloride being not distillable at temperatures up to 170° C. at 8 millimeters mercury gauge.

Example 6

33 parts of benzene sulphonic dodecyl ester, obtainable by the interaction of benzene sulphonic chloride and dodecyl alcohol dissolved in ethyl ether in the presence of pulverized potassium hydroxide, are heated with 12 parts of pyridine for from 3 to 5 hours at from 80° to 85° C. until a sample dissolves in water to a limpid solution. After cooling the solidified N-dodecylpyridinium benzene sulphonate is stirred with a little ethyl ether and filtered off by suction. It dissolves easily in water and furnishes strongly foaming and wetting solutions.

Example 7

375 parts of chlorsulphonic acid are introduced at from 20° to 30° C. into 500 parts of the mixture of alcohols having a boiling point from 100° to 160° C. at 15 millimeters of mercury and prepared by the reduction of coco fat. The sulphuric ester of the mixture of alcohols is stirred into 2000 parts of an about 80 per cent aqueous solution of crude mono-ethanol amine containing a small quantity of di- and tri-ethanol amines, whereupon the mixture is heated for 6 hours at 200° C. Two layers are formed, the upper of which is separated off and freed from water and residual ethanol amine by heating to 150° C. in vacuo. The product is a mixture of from decyl to tetradecyl amines containing from one to two ethanol radicles connected to nitrogen and some ethanol amines containing 2 from decyl to tetradecyl radicles.

Example 8

50 parts of the sodium salt of the sulphuric ester referred to in the foregoing example are heated together with 100 parts of hexamethylene tetramine in a highly pressure-tight autoclave for 6 hours at 150° C., whereby the hexamethylene tetramine is decomposed. The oily reaction product is separated off and distilled in vacuo. A mixture of amines is obtained which is easily soluble in aqueous solutions of acids.

Example 9

20 parts of the sodium salt of the acid sulphuric ester of oleic alcohol, obtainable by acting on the said alcohol with chlorsulphonic acid in a cold solution of ethyl ether, are heated together with 80 parts of an about 50 per cent aqueous solution of dimethyl amine for 8 hours at 150° C. The resulting oily reaction product is separated from the aqueous solution and washed with dilute aqueous caustic soda solution. With dilute aqueous hydrochloric acid and N-octo-decenyl-N-dimethyl amine forms strongly foaming limpid solutions.

Example 10

72 parts of octodecandiol, obtainable by the catalytic reduction of castor oil, are suspended in 100 parts of ethyl ether and 60 parts of chlorsulphonic acid are added. The acid octodecandiol di-sulphuric ester obtained is converted in the usual manner into the sodium salt and the solution is inspissated to 320 parts.

The pasty mass is then heated with 140 parts of n-butyl-amine in a stirring autoclave for 8 hours at 200° C. whereupon the reaction product is taken up in ethyl ether and washed with aqueous dilute caustic soda solution. On distilling off the ether, the crude semi-solid reaction product, which is soluble in dilute aqueous acetic acid solution, remains.

Example 11

190 parts of the mixture of alcohols having a boiling point of from 90° to 140° C. at 15 millimeters of mercury, consisting mainly of octanol, decanol and dodecanol and obtained by the catalytic reduction of coco fat and distillation of the resulting product, are converted into the acid sulphuric esters by means of chlorsulphonic acid. The sodium salt of the sulphuric ester mixture is heated in an autoclave for 8 hours at 180° C. together with 650 parts of an aqueous 50 per cent solution of dimethyl amine. After cooling the reaction product forms two layers, the upper of which is drawn off and washed with water. The resulting mixture of amines of high molecular weight furnishes with dilute aqueous hydrochloric acid limpid and strongly foaming solutions.

Example 12

300 parts of sorbitol are introduced into 600 parts of sulphuric acid monohydrate at from 20° to 25° C. whereupon 600 parts of fuming sulphuric acid containing 23 per cent of sulphur trioxide are slowly added and the whole is stirred for several hours either at room temperature or while warming to from 30° to 35° C. until the sorbitol is completely dissolved. The viscous reaction product is then stirred into a pulp of lime for precipitating free sulphuric acid, the solution is filtered off from the calcium sulphate and the dissolved calcium salts are converted into the sodium salt in the usual manner. The solution is inspissated to 800 parts and then heated in a stirring autoclave for 10 hours at from 150° to 160° C. together with 800 parts of n-butyl amine. After cooling the solution is drawn off from sodium sulphate separated out and rendered alkaline with strong aqueous caustic soda solution whereby the reaction product together with residual butyl amine separate out as an oily layer. On distillation the oily product is freed from butyl amine, dispersed in water for removing water-insoluble oils and precipitated again from the aqueous solution with the aid of strong aqueous caustic soda solution.

Example 13

35 parts of the ammonium salt of the acid sulphuric ester of octodecyl alcohol are heated with 100 parts of an aqueous 18.5 per cent solution of ammonia in an autoclave for 5 hours at from 150° to 155° C. After cooling, the solid cake of crystals formed is separated from the aqueous solution. By recrystallization from benzene or ethyl alcohol the di-octodecyl amine obtained in preponderating quantities is easily obtained in a pure form and then possesses a melting point of from 73° to 74° C.

Example 14

170 parts of the sodium salt of the acid sulphuric ester of octodecyl alcohol are heated for 10 hours at 200° C. together with 1000 parts of a 50 per cent aqueous solution of tri-ethanol amine. After cooling the solid mass separated out is filtered by suction, washed with water and dried. By distillation in vacuo at from 2 to 3 millimeters of mercury the product is freed from octodecyl alcohol formed by hydrolytic splitting. The solid residue which contains a mixture of hydroxy-alkyl amines, apparently mainly N-diethanol octodecyl amine, furnishes with dilute aqueous acetic acid an almost limpid solution.

If sulphuric esters of alcohols having a lower molecular weight than octodecyl alcohol, as for example of octanol, decanol or dodecanol or mixtures of these, be brought into reaction with tri-ethanol amine in the manner described, a mixture of liquid hydroxyalkyl amines is obtained the salts of which show a high foaming and wetting out power when dissolved in aqueous solutions.

Example 15

20 parts of the sodium salt of the sulphuric ester of hexahydrobenzyl alcohol are heated for 6 hours at 180° C. with 100 parts of a 50 per cent aqueous solution of benzylamine. The oily layer formed is drawn off, washed with water and distilled, whereby N-benzyl, N-hexahydrobenzyl amine is obtained at from 150° to 160° C. at 12 millimeters of mercury. The chlorhydrate of the amine is difficultly soluble.

Example 16

25 parts of the sodium salt of the sulphuric ester of octodecyl alcohol are heated for 8 hours at from 180° to 200° C. with 50 parts of 1.3-propanol amine and 100 parts of water. Mono-N-hydroxy propyl N-octodecyl amine is obtained which is isolated from the solid reaction product by extraction with the aid of ethyl ether or of benzene and may be further purified by conversion into the hydrochloride and recrystallization from ethyl alcohol.

Example 17

50 parts of the sodium salt of the mixture of sulphuric esters according to Example 7 are heated for 8 hours at 200° C. with 200 parts of a 20 per cent aqueous solution of trimethyl amine. The mixture of amines obtained separates out from the reaction solution as an oily layer on dilution with water.

Example 18

25 parts of the sodium salt referred to in Examples 7 and 17 are heated in an autoclave for 6 hours at from 180° to 200° C. together with 50 parts of tetraethylammonium chloride and 40 parts of a 10-N aqueous caustic soda solution. The pressure rises considerably and, after cooling and releasing the residual pressure, the oil formed is separated and the amines of high molecular weight contained in the oil are recovered by extraction with an aqueous hydrochloric acid solution.

What I claim is:—

1. The process for the production of organic amino compounds which comprises heating an ammonia base with an ester of a polybasic oxygen-bearing mineral acid and an aliphatic alcohol containing more than 5 carbon atoms.

2. The process for the production of organic amino compounds which comprises heating an ammonia base with an ester of a polybasic oxygen-bearing mineral acid and an aliphatic alcohol containing more than 5 carbon atoms to a temperature between 80° and 300° C.

3. The process for the production of organic amino compounds which comprises heating an ammonia base with an ester of a polybasic oxygen-bearing mineral acid and an aliphatic alcohol containing more than 5 carbon atoms in the presence of an inert liquid diluent.

4. The process for the production of organic amino compounds which comprises heating an ammonia base with an ester of a polybasic oxygen-bearing mineral acid and an aliphatic alcohol containing more than 5 carbon atoms to a temperature between 80° and 300° C. in the presence of an inert liquid diluent.

5. The process for the production of organic amino compounds which comprises heating an ammonia base with a salt of an acid ester of a polybasic oxygen-bearing mineral acid and an aliphatic alcohol containing more than 5 carbon atoms to a temperature between 80° and 300° C. in the presence of an inert liquid diluent.

6. The process for the production of organic amino compounds which comprises heating an ammonia base with a sulphuric ester of an aliphatic alcohol containing more than 5 carbon atoms to a temperature between 80° and 300° C.

7. The process for the production of organic amino compounds, which comprises heating an ammonia base with an acid sulphuric ester of an aliphatic alcohol containing more than 5 carbon atoms to a temperature between 80° and 300° C.

8. The process for the production of organic amino compounds which comprises heating an ammonia base with a salt of an acid sulphuric ester of an aliphatic alcohol containing more than 5 carbon atoms to a temperature between 80° and 300° C.

9. The process for the production of organic amino compounds which comprises heating an ammonia base with a phosphoric ester of an aliphatic alcohol containing more than 5 carbon atoms to a temperature between 80° and 300° C.

10. The process for the production of organic amino compounds which comprises heating a sulphuric ester of an aliphatic alcohol containing more than 5 carbon atoms with ammonia in a closed vessel to a temperature between 80° and 300° C.

11. The process for the production of organic amino compounds which comprises heating a sulphuric ester of an aliphatic alcohol containing more than 5 carbon atoms with an amine to a temperature between 80° and 300° C.

12. The process for the production of organic amino compounds which comprises heating a sulphuric ester of an aliphatic alcohol containing more than 5 carbon atoms with a secondary amine to a temperature between 80° and 300° C.

13. The process for the production of organic amino compounds which comprises heating a sulphuric ester of an aliphatic alcohol containing more than 5 carbon atoms with a tertiary amine to a temperature between 100° and 250° C.

14. The process for the production of organic amino compounds which comprises heating a sulphuric ester of an aliphatic alcohol containing more than 5 carbon atoms with an ammonia base to a temperature between 80° and 300° C. in the presence of an aqueous inert diluent.

15. The process for the production of organic amino compounds which comprises heating a sulphuric ester of an aliphatic alcohol containing from 8 to 18 carbon atoms with an aliphatic amine to a temperature between 100° and 250° C.

16. The process for the production of organic amino compounds which comprises heating a sulphuric ester of an aliphatic alcohol containing from 8 to 18 carbon atoms with an alkylolamine to a temperature between 100° and 250° C.

17. A mixture of different amines each of which corresponds to the formula

wherein X represents a radicle of an aliphatic alcohol boiling between about 90° and about 160° C. at 15 millimeters mercury gauge, Y is one of the group consisting of a radicle of an aliphatic alcohol boiling between about 90° and about 160° C. at 15 millimeters mercury gauge, a low alkyl radicle and an alkylol radicle and Z is one of the group consisting of hydrogen, a straight chain low alkyl radicle, a cycloalkyl radicle and a low alkylol radicle.

18. A mixture of different amines each of which corresponds to the formula

wherein X represents a radicle of an aliphatic alcohol obtained by reduction of coconut oil, Y is one of the group consisting of a radicle of an aliphatic alcohol obtained by reduction of coconut oil, a low alkyl radicle and an alkylol radicle, and Z is one of the group consisting of hydrogen, a straight chain low alkyl radicle, a cycloalkyl radicle and a low alkylol radicle.

19. A secondary amine corresponding to the formula X—NH—Y, wherein X is an aliphatic radicle containing from 6 to 18 carbon atoms and free from hydroxyl groups and Y is a low alkylol radicle.

20. A secondary amine corresponding to the formula X—NH—CH$_2$—CH$_2$OH, wherein X is an aliphatic radicle containing from 6 to 18 carbon atoms and free from hydroxyl groups.

21. A mixture of secondary amines each of which corresponds to the formula X—NH—CH$_2$.CH$_2$.OH, wherein X is an aliphatic radicle containing from 12 to 18 carbon atoms.

22. Monoethanol-octodecylamine.

23. A secondary amine corresponding to the formula X—NH—Y, wherein X represents an unsaturated aliphatic radicle containing at least 6 carbon atoms and Y represents an alkylol radicle.

24. A secondary amine corresponding to the formula X—NH—CH$_2$.CH$_2$OH, wherein X represents an unsaturated aliphatic radicle containing at least 6 carbon atoms.

25. A mixture of different amines each of which corresponds to the formula X—NH—CH$_2$.CH$_2$OH, wherein X represents an unsaturated aliphatic radicle containing at least 6 carbon atoms.

HERMANN HOLSTEN.